Sept. 30, 1924.

S. B. HASELTINE 1,510,274

FRICTION SHOCK ABSORBING MECHANISM

Filed Nov. 8, 1922   2 Sheets—Sheet 1

Witnesses
Wm Geiger

Inventor
Stacy B. Haseltine
By Geo. I. Haight
  his Atty.

Sept. 30, 1924.  
S. B. HASELTINE  
1,510,274
FRICTION SHOCK ABSORBING MECHANISM
Filed Nov. 8, 1922  2 Sheets—Sheet 2
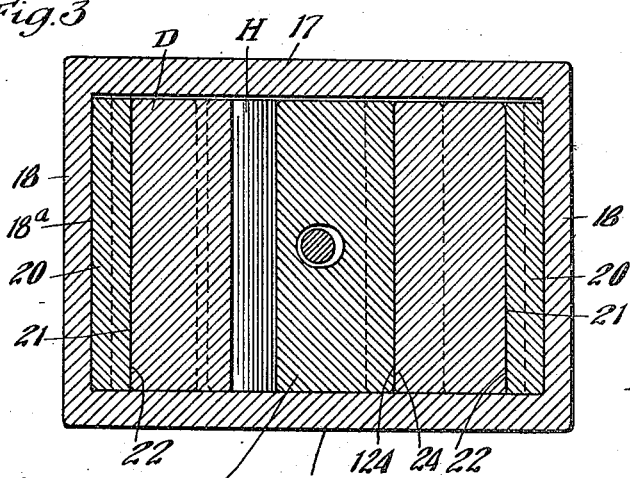
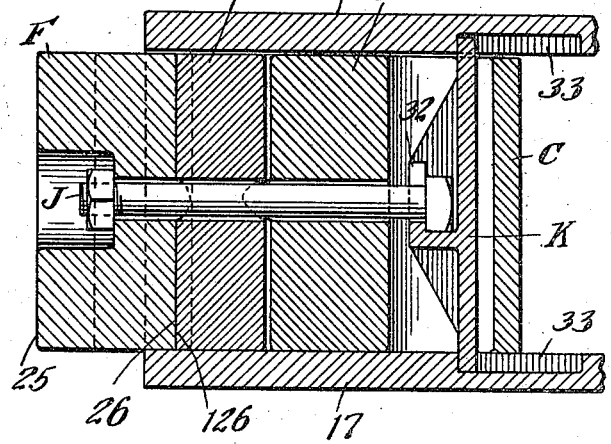
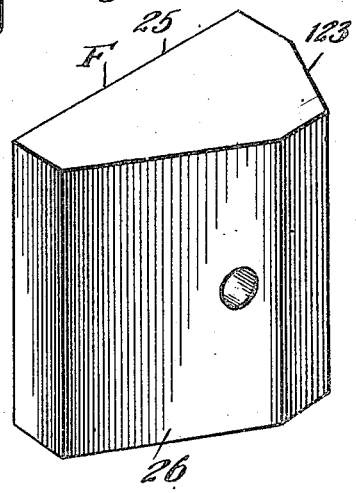
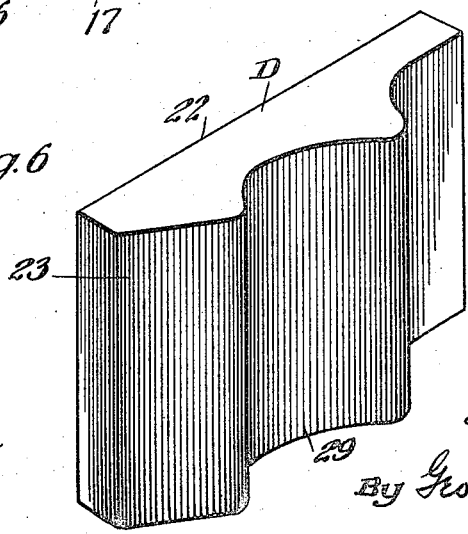
Witnesses
Wm. Geiger
Inventor
Stacy B. Haseltine
By Geo. J. Haight
His Atty.

Patented Sept. 30, 1924.

1,510,274

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 3, 1922. Serial No. 599,639.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein are obtained high capacity and certain release, but more specifically such a mechanism wherein the desired high frictional capacity is obtained primarily by one set of wedge faces and the release insured by a different set of inclined faces.

More specifically, an object of the invention is to provide, in a mechanism of the character indicated, means additional to the pressure-transmitting means proper interposed between friction shoes for the purpose of better distributing the lateral pressure more efficiently throughout the length of the friction shoes.

Figure 1:
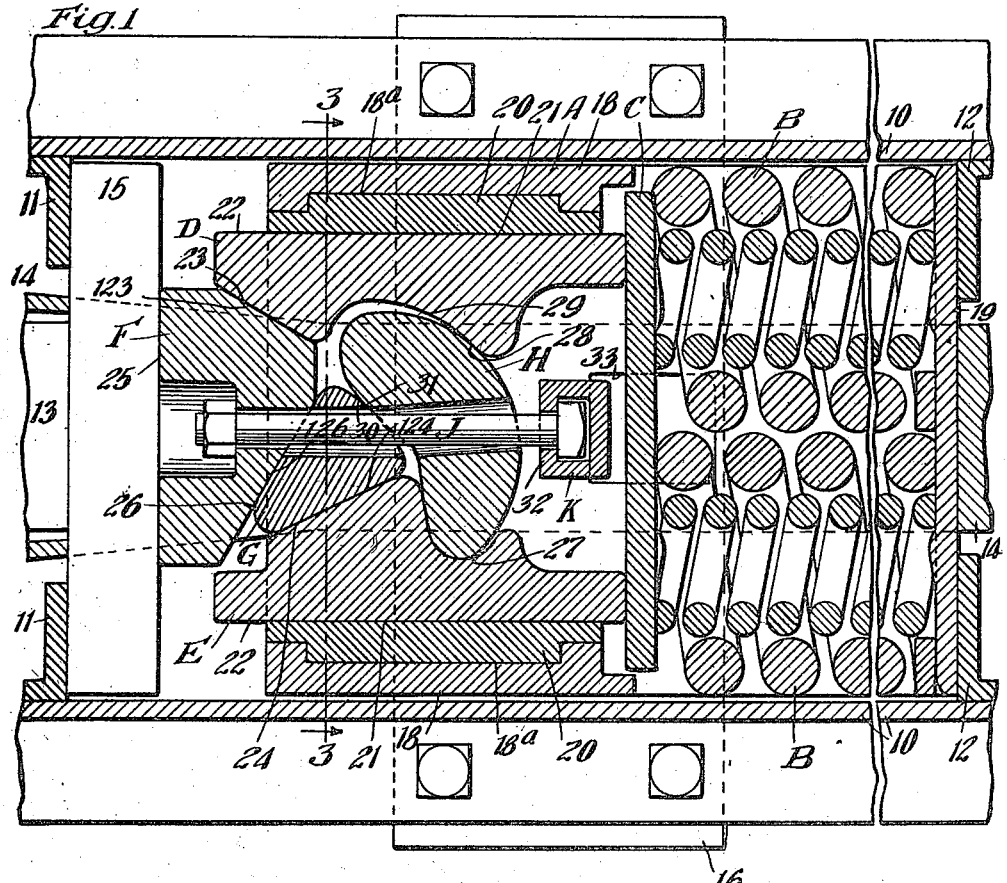
Figure 2:
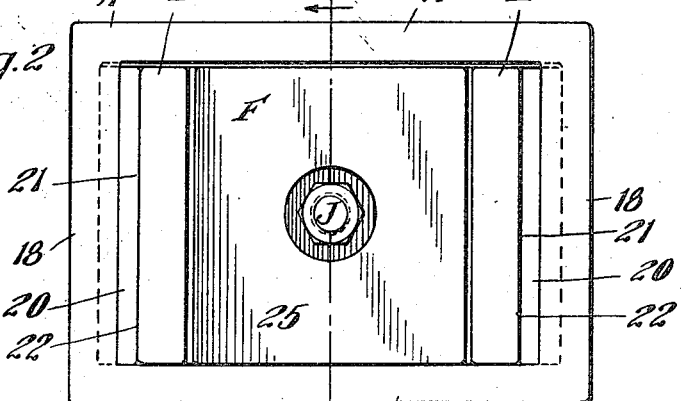

In the drawings forming a part of this specification, Figure 1 is a horizontal longitudinal sectional view of a portion of a railway draft rigging showing my improvements in connection therewith, parts being broken away to better accommodate the figure on the sheet. Figure 2 is a front end elevation of the shock absorbing mechanism proper. Figure 3 is a vertical transverse sectional view of the shock absorbing mechanism proper corresponding to the line 3—3 of Figure 1. Figure 4 is a longitudinal sectional view taken substantially on the line 4—4 of Figure 2. And Figures 5 and 6 are detail perspectives of one of the elements of the spreading means and one of the friction shoes, respectively.

In said drawings, 10—10 denote channel draft sills of a car underframe to the inner faces of which are secured front stop lugs 11 and rear stop lugs 12. A portion of a draw bar is indicated at 13, the same being operatively associated with the shock absorbing mechanism proper by a hooded cast yoke 14 within which is disposed the shock absorbing mechanism proper and a front follower 15. The yoke and parts therewithin are supported in operative position by a detachable saddle plate 16.

The improved shock absorbing mechanism proper, as shown, comprises, broadly, a combined friction shell and spring cage casting A; twin arranged springs B—B; a spring follower C; a pair of friction shoes D and E; an outer spreading element F; an inner spreading element G; an auxiliary spreading element H; a retainer bolt J; and an anchor bar K.

The casting A, as shown, is of rectangular cross section having top and bottom walls 17—17, side walls 18—18 and rear vertical wall 19 integrally uniting the top and bottom walls 17. The side walls 18 are left comparatively short to thereby leave the major portion of the sides of the casting A open so as to permit of the insertion and removal of the springs and certain other parts. The side walls 18, on their inner sides, are recessed, as indicated at 18$^a$ to receive detachable and renewable hardened liners 20, each of the latter, on its inner side, providing a longitudinally extending shell friction surface 21.

Each of the friction shoes D and E, which are laterally opposed to each other within the shell, is provided on its outer side with a longitudinally extended flat friction surface 22 cooperable with the corresponding adjacent shell friction surface 21. On its inner side, the shoe D, at its outer end, is provided with an inclined face 23 which extends rearwardly and toward the axis of the mechanism at a relatively acute and true wedging angle with respect to forces applied parallel or substantially parallel to the axis of the mechanism. Similarly, the other friction shoe E is provided with a keen angle wedging face 24, the latter, however, being disposed a short distance inwardly of the wedge face 23.

The pressure receiving and transmitting outer spreading element F is provided on its outer side with a flat bearing face 25 engaging the inner face of the follower 15. On one side adjacent the shoe D, the element F is provided with an inclined face 123 extending at the same angle as, and cooperable with, the wedge face 23 of said shoe D. On its opposite side, the element F is provided with another face 26 extending across the center line of the mechanism and at a relatively blunt and true releasing angle with respect to the axis of the mechanism.

The second element G of the main spreading means is of generally triangular cross section, as clearly shown in Figure 1, and on its outer side is provided with an inclined face 126 extending at the same angle as, and cooperable with, the blunt angle face 26 of the element F. On its other side, the element G is provided with another face 124 extending at the same angle as, and cooperable with, the wedge face 24 of the shoe E.

Inwardly of the enlargement upon which the wedge face 24 is provided, the shoe E is formed with a rounded fulcrum bearing 27 for one end of the kidney-shaped cam rocker lever or auxiliary spreading element H. The latter has its convex surface 28 arranged to bear upon a concave bearing surface 29 formed on the shoe D at a point inwardly of the wedge face 23 thereof. In actual practice, the radius of the bearing face 29 will be somewhat greater than the radius of the convex surface 28 of the element H. The spreader element G, at its inner end, is rounded or convexed, as indicated at 30, and has a combined sliding and rolling action upon the rounded bearing surface 31 of the auxiliary spreading element H, the point of contact therebetween being approximately in line with the axis of the mechanism.

All three elements, F, G and H, are suitably apertured to accommodate the shank of the retainer bolt J, as clearly shown in Figure 1, the outer end of said bolt being anchored to the element F and the inner end thereof being anchored beneath a slotted overhanging flange 32 formed on the front side of the anchor bar K. The latter extends vertically within the casting A, as viewed in the drawings, the top and bottom ends of said bar K working within longitudinally disposed grooves 33 formed on the inner side of the top and bottom wall of the casting A. As will be apparent from an inspection of Figure 4, the anchor bar K is limited in its outward movement to the position therein shown, and, consequently, the retainer bolt is adapted to hold all of the parts in assembled position and also may be utilized to place the springs under initial compression.

The inner ends of the friction shoes D and E bear upon a spring follower C, the latter in turn bearing upon the front ends of the twin arranged springs B so as to thereby provide yielding resistance for relative movement between the friction shoes and the shell.

In operation, assuming a compression stroke under buff, the two main spreading elements F and G will move rearwardly substantially as a solid unit inasmuch as the coacting faces 126 thereon extend at such a blunt angle with respect to the applied force that there will be no slippage, or appreciable slippage, therebetween. Consequently, the two elements F and G, acting substantially as a solid unit, will have the effect of a single wedge with keen angle faces 123 and 124, thereby producing a heavy spreading action upon the shoes D and E near their outer ends. The two elements F and G acting as above described with respect to the shoes D and E, will tend to move inwardly of the shoes D and E, and, consequently, tend to induce the element H to rock upon the pivot or fulcrum forming bearing 27. As the element H is thus induced to rock, the convex surface of the element H tends to slide along the concave bearing surface 29 of the shoe D, and, hence, to induce further spreading or separation of the two shoes D and E at points disposed considerably inwardly of the points where the main spreading action takes place. In this manner, it will be apparent that I distribute the spreading action throughout a considerable length of the shoes D and E, thus insuring evenly distributed pressure over the engaging friction surfaces of the shoes and shell.

Upon removal of the actuating force, the element F is free to fall away from the shoe D and other wedge element G by reason of the blunt releasing angle of the cooperating faces 26 and 126, and also because of the fact that the included angle between the wedge face 23 and the face 126 is relatively obtuse so that there will be no danger of sticking of the parts, as will be obvious. As soon as the initial release takes place between the elements F and G, it is evident that the latter will then be free to collapse with respect to the shoe E, and thereafter all of the parts of the friction unit may be easily projected outwardly to their normal full release position under the influence of the expanding springs.

Although I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a friction shell having opposed interior friction surfaces; of a spring resistance; opposed friction shoes cooperable with the shell; pressure receiving and transmitting spreading means, said shoes and means having a plurality of sets of faces inclined relatively to the axis of the mechanism, part of which are arranged at a relatively keen wedge-acting angle and others at a relatively blunt releasing angle, and auxiliary spreading means between and having direct engagement with said opposed friction shoes, said auxiliary spreading means having also engagement with and receiving pressure from said first named spreading means, and having its movement inwardly of the shell directly opposed by contact with said shoes.

2. In a friction shock absorbing mechanism, the combination with a friction shell having opposed interior friction surfaces; of a spring resistance; opposed friction shoes cooperable with the shell; pressure receiving and transmitting spreading means, said shoes and means having a plurality of sets of faces inclined relatively to the axis of the mechanism, part of which are arranged at a relatively keen wedge-acting angle and others at a relatively blunt releasing angle; and auxiliary spreading means between and having direct engagement with said opposed friction shoes, said auxiliary spreading means having also engagement with and receiving pressure from said first named spreading means, said auxiliary spreading means comprising a cam lever.

3. In a friction shock absorbing mechanism, the combination with a friction shell having opposed interior friction surfaces; of a spring resistance; opposed friction shoes cooperable with the shell; pressure receiving and transmitting spreading means comprising two elements, each element having wedge engagement with a shoe and the two elements having blunt angle engagement with each other; and auxiliary spreading means between, and having direct engagement with, said opposed friction shoes inwardly of the first named spreading means, said auxiliary spreading means having engagement with one of said elements.

4. In a friction shock absorbing mechanism, the combination with a friction shell having opposed interior friction surfaces; of a spring resistance; opposed friction shoes cooperable with the shell; pressure receiving and transmitting spreading means comprising two elements, each element having wedge engagement with a shoe and the two elements having blunt angle engagement with each other; and auxiliary spreading means between, and having direct engagement with, said opposed friction shoes inwardly of the first named spreading means, said auxiliary spreading means having engagement with one of said elements, said auxiliary spreading means comprising a cam lever.

5. In a friction shock absorbing mechanism, the combination with a friction shell having opposed interior friction surfaces; of a spring resistance; opposed friction shoes cooperable with the shell; a pressure receiving and transmitting element having keen wedge angle engagement with one shoe; a second pressure transmitting element having keen angle engagement with the other shoe and relatively blunt angle engagement with the first named element; and auxiliary spreading means disposed inwardly of said second named element and having engagement with the latter and also with each of the shoes.

6. In a friction shock absorbing mechanism, the combination with a friction shell having interior longitudinally extending friction surfaces; of friction shoes cooperable with said shell; a spring resistance; a multiple part wedge cooperable with the shoes, the parts of said wedge having relatively keen angled wedging engagement with the shoes under actuating forces applied to compress the mechanism, said parts of the wedge having blunt releasing angle engagement with each other, permitting collapse upon cessation of the actuating forces; and auxiliary spreading means operative directly between the friction shoes.

7. In a friction shock absorbing mechanism, the combination with a friction shell; of a spring resistance; an expansible friction unit movable within said shell, said unit comprising a plurality of parts having three sets of transversely opposed cooperating faces all inclined relatively to the axis of the shell, at least one of said sets of faces extending at a keen wedging angle with respect to applied actuating forces and at least one of said sets at a readily releasing angle; and auxiliary spreading means disposed inwardly of said unit in spaced relation to said spring resistance and having contact with both of said shoes and one of the parts of said unit.

8. In a friction shock absorbing mechanism, the combination with a friction shell having interior longitudinally extending friction surfaces; of friction shoes cooperable with said shell; a spring resistance; a multiple part wedge cooperable with the shoes, the parts of said wedge having relatively keen angled wedging engagement with the shoes under actuating forces applied to compress the mechanism, said parts of the wedge having blunt releasing angle engagement with each other, permitting collapse upon cessation of the actuating forces; and auxiliary spreading means operative directly between the friction shoes, said auxiliary spreading means comprising a cam lever pivoted with respect to one of the shoes.

9. In a friction shock absorbing mechanism, the combination with a friction shell; of a spring resistance; an expansible friction unit movable within said shell, said unit comprising a plurality of parts having three sets of transversely opposed cooperating faces all inclined relatively to the axis of the shell, at least one of said sets of faces extending at a keen wedging angle with respect to applied actuating forces and at least one of said sets at a readily releasing angle; and auxiliary spreading means disposed inwardly of said unit and having contact with both of said shoes and one of the parts of said unit, said auxiliary spreading means comprising a cam lever pivoted with respect to one of the shoes and slidable with respect to the other of the shoes.

10. In a friction shock absorbing mechanism, the combination with a friction shell having interior longitudinally extending friction surfaces; of a spring resistance; opposed friction shoes cooperable with the friction shell; a pressure receiving and transmitting element having keen angled wedging engagement with one of said shoes; a second pressure transmitting element having blunt angle engagement with said first element and keen wedge angle engagement with an opposed shoe; and an arcuate cam lever pivoted with respect to one of said shoes and having curved bearing engagement with an opposed shoe and with said second named element.

In witness that I claim the foregoing I have hereunto subscribed my name this 29th day of September, 1922.

STACY B. HASELTINE.

Witnesses:
UNA C. GRIGSBY,
H. M. DEAME.